US008538935B2

(12) United States Patent
Healy et al.

(10) Patent No.: US 8,538,935 B2
(45) Date of Patent: Sep. 17, 2013

(54) ONE-TO-ONE AND ONE-TO-MANY RELATIONSHIPS IN DATABASES

(75) Inventors: James J. Healy, Apex, NC (US); David Richard Conorozzo, Cary, NC (US)

(73) Assignee: FormRouter Inc., Cary, NC (US)

( * ) Notice: Subject to any disclaimer, the term of this patent is extended or adjusted under 35 U.S.C. 154(b) by 89 days.

(21) Appl. No.: 12/888,125

(22) Filed: Sep. 22, 2010

(65) Prior Publication Data

US 2011/0078216 A1 Mar. 31, 2011

Related U.S. Application Data

(60) Provisional application No. 61/245,986, filed on Sep. 25, 2009.

(51) Int. Cl.
*G06F 17/30* (2006.01)
(52) U.S. Cl.
USPC .......................................... 707/693; 707/697
(58) Field of Classification Search
USPC .................................................. 707/697, 693
See application file for complete search history.

(56) References Cited

U.S. PATENT DOCUMENTS

| 3,933,099 | A | * | 1/1976 | Sieb | 104/88.04 |
|---|---|---|---|---|---|
| 4,385,352 | A | * | 5/1983 | Bienvenu | 711/208 |
| 6,049,667 | A | * | 4/2000 | Bates | 717/138 |
| 7,533,039 | B2 | * | 5/2009 | Hoffman et al. | 705/15 |
| 7,756,859 | B2 | * | 7/2010 | Simonyi | 707/718 |
| 2008/0270361 | A1 | * | 10/2008 | Meyer et al. | 707/3 |
| 2009/0327277 | A1 | * | 12/2009 | Sanborn et al. | 707/5 |
| 2009/0327339 | A1 | * | 12/2009 | Berger et al. | 707/103 Y |
| 2010/0107045 | A1 | * | 4/2010 | Filippova et al. | 715/205 |
| 2010/0223541 | A1 | * | 9/2010 | Clee et al. | 715/205 |
| 2011/0004908 | A1 | * | 1/2011 | Eyer | 725/56 |

* cited by examiner

*Primary Examiner* — Baoquoc N To
(74) *Attorney, Agent, or Firm* — Fish & Richardson P.C.

(57) ABSTRACT

Methods, systems, and apparatuses describing one-to-one and one-to-many relationships in databases. A form configured to receive form data for storage in a database is received. The form includes multiple instructions to split the form data into a main fragment and data fragments, each of which is storable in the database. The form data is split the main fragment and the data fragments based on the instructions. The main fragment and the data fragments are linked to track the form data, and the fragments are stored in the database.

33 Claims, 7 Drawing Sheets

ONE-TO-ONE AND ONE-TO-MANY RELATIONSHIPS IN DATABASES

TECHNICAL FIELD

This specification relates to storing data received in forms, in databases.

BACKGROUND

Electronic forms can be configured to receive data. For example, an electronic form can include several fields, each of which can be configured to receive data. Systems can be configured to receive data through the electronic forms. Such systems can store the data in an electronic form in databases. To do so, for example, the system can designate tables and fields in a database to store the data received through the electronic form, and store the data based on the designation. In some situations, the form may be configured to receive more fields of data than a table in a database is capable of storing. In such situations, when the system receives the electronic form that includes the data, the system may either reject or truncate the excess fields of data that the table cannot store. For example, if a form includes 1000 fields of data, but a table in the database is configured to store at most 256 fields, then the system may reject data in excess of the 256 fields.

In some situations, unrelated fields of data can be received through a single electronic form. Alternatively, related fields of data can be received through separate electronic forms. The system that receives the one or multiple electronic forms can be encoded to manipulate the incoming data. For example, the system can be encoded to store the related fields of data, received through each of the separate electronic forms, in a corresponding separate table. The system can further be encoded to link the separate tables to manipulate the related data. In such situations, the instructions for mapping the form data to the database are fixed in the system. Thus, the system is encoded to modify the database to accommodate and adapt to each electronic form that the database will receive.

SUMMARY

This specification describes technologies relating to one-to-one and one-to-many relationships in databases. The techniques described here allows directives for table and field mapping of form data to be embedded inside of electronic forms.

In general, one innovative aspect of the subject matter described in this specification can be implemented as a method implemented by a computer system including one or more computers. An electronic form configured to receive form data is received at the computer system. The form data is for storage in a database configured to store the form data. The electronic form includes an instruction to fragment the form data into multiple fragments of the form data. The form data is fragmented into the multiple fragments based on the instruction. Each fragment of the form data is stored in a corresponding location of the database. Multiple locations of the database in which the multiple fragments of the form data are stored are linked to track the form data.

This, and other aspects, can include one or more of the following features. The multiple fragments can include a master fragment and a child fragment. The master fragment and the child fragment can be linked by an identifier stored in both the master fragment and the child fragment. The identifier can be dynamically generated upon receiving the electronic form. The instruction can include a first sub-instruction that identifies a location of the database and a second sub-instruction that identifies a fragment of the form data to be stored in the location of the database identified by the first sub-instruction. Fragmenting the form data into the multiple fragments of the form data based on the instruction can include storing the fragment of the form data identified by the second sub-instruction in the location of the database identified by the first sub-instruction. The first sub-instruction and the second sub-instruction can be configured to receive variable values that specify the location of the database and the fragment of the form data, respectively. It can be determined that a sub-instruction, included in the instruction, that identifies a location of the database in which a fragment of the form data is to be stored does not have a value. In response to the determining, the fragment of the form data can be stored in a default location of the database. A location of the database can include a table that includes multiple fields. Fragmenting the form data into the multiple fragments of the form data can include determining that a first number of multiple first fields included in the electronic form to receive the form data is greater than a second number of the multiple fields included in the table.

Another innovative aspect of the subject matter described in this specification can be implemented as a computer-readable storage medium storing computer program instructions executable by data processing apparatus to perform the operations described here. An additional innovative aspect of the subject matter described in this specification can be implemented as a system that includes data processing apparatus and a computer-readable storage medium storing computer program instructions executable by the data processing apparatus to perform the operations described here.

Particular implementations of the subject matter described in this specification can be implemented to realize one or more of the following advantages. Including directives in an electronic form can decrease or negate the need to configure a database to accommodate data received in more fields than the database is capable of storing. Specifically, for example, an administrator of an electronic form data capture process need not configure or program table and field mapping instructions on a server. Because the directives embedded inside of electronic forms can split incoming field data into multiple database tables with linking keys, one-to-one and one-to-many relationships can be created dynamically as data is written to a database. In addition, electronic forms can be allowed to adjust dynamically (i.e., as the electronic form receives data). Further, the mapping of field data to tables and fields in the database can be modified. The data received in the electronic forms can be stored in any database without prior knowledge of the database. For example, because table and field mapping directives can be embedded into electronic forms, the administrator of the form data capture system need not know the type of database or storage system in which the data will be collected. Consequently, data can be written to many different types of databases systems in many different geographic locations.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Databases can be configured to store data, for example, in one or more tables, each of which can store the data in several fields. For example, a table is configured to store a maximum of 256 fields. An electronic form (or form) can be configured to receive form data for storage in a database. The form can be implemented as computer program instructions that are executed by data processing apparatus (for example, a computer). When executed, the form can be rendered on a user interface of a display device. The form can further be configured to receive data from the user in one or more fields. The data received from the user (i.e., form data) can include, for example, characters of different types, such as text, numbers, and the like, and can represent, for example, names, addresses, dates of birth, and the like. In some situations, a form provided to a user can have more than 256 fields (for example, 1000 or 2000 fields) into which the user can provide data. The techniques described with reference to the following figures describe fragmenting form data received through a form and storing the fragments in the database. In particular, the database in which the fragments are stored need not be custom-modified to accommodate the form data. To do so, in some implementations, instructions to fragment the form are included in the form itself, as described in detail below.

Figure 1:
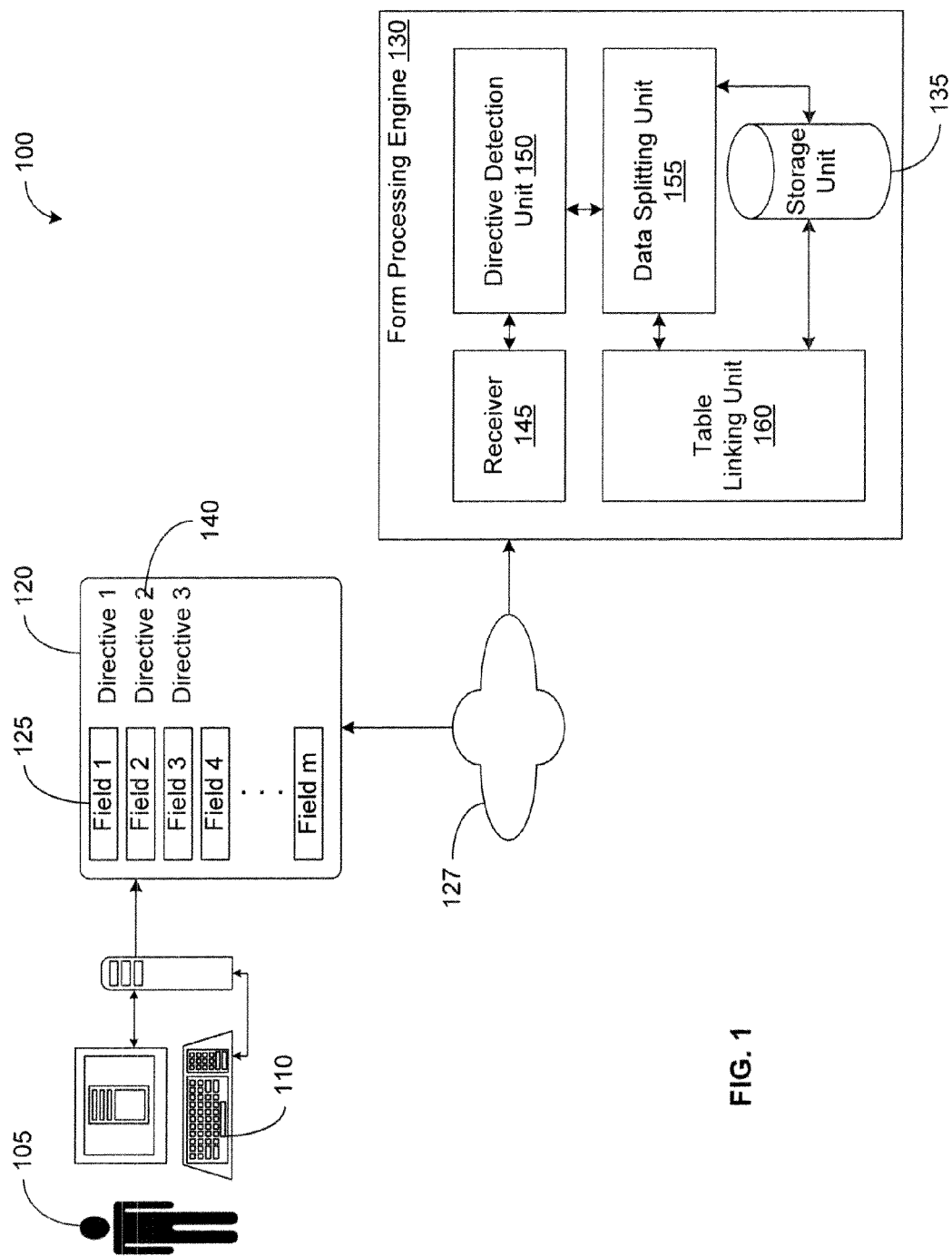
FIG. 1 is an example of a system to store form data, received through a form, in a database.

FIG. 1 is an example of a system 100 to store form data, received through a form, in a database. A user 105 of a computer system 110 (for example, desktop computer, laptop computer, personal digital assistant, and the like) provides data that is received by the form. To do so, for example, a form 120 is displayed in a display device operatively coupled to the computer system 110. Using input devices (for example, keyboard, mouse, and the like), the user 105 enters data into various fields 125 (for example, field 1, field 2, . . . , field m) in the form 120. The user can transmit the form 120, that includes the form data, over one or more networks 125 (for example, the Internet), to a form processing engine 130.

The form processing engine 130 is configured to receive the form 120 and to store the form in a storage unit 135. For example, the form processing engine 130 can be a computer system that includes data processing apparatus that can execute computer program instructions to perform operations to receive the form, fragment the form data into fragments, and store the fragments in the storage unit 135. The form processing engine 130 can fragment the form data into multiple fragments based on one or more instructions 140 (or directives, such as directive 1, directive 2, directive 3).

The instructions 140 can be encoded into the form as hidden fields that are invisible to a user 105. When the user 105 enters data into the fields 125 of the form 120 and transmits the form 120 to the form processing engine 130, the engine 130 can scan the form to identify the instructions 140. For example, if the form data in the form 120 is configured to be stored in a table in the storage unit 135 that can accommodate 256 fields, and if the form 120 includes 1000 fields of data, based on the instruction 140, the engine 130 can fragment the form data into four fragments, each including at most 256 fields of data.

In that situation, the engine 130 can fragment the form data into multiple fragments of the form data based on the instruction 140, and store each fragment of the form data in a corresponding location of the storage unit 135, for example, a corresponding table. By doing so, the form processing engine 130 receives more fields of form data than a table of the storage unit 135 is configured to store and dynamically modifies the received data so as to store the data in the storage unit 135. Further, the form processing engine 130 can link each fragment of the multiple fragments of form data to track the form data. For example, based on a unique identifier associated with each fragment of the multiple fragments, the form processing engine 130 can track the different fragments into which the form data has been fragmented. In some implementations, as described later, each fragment can be stored in a computer-readable table. The unique identifier also can be stored in each computer-readable table such that the computer-readable tables can be identified in response to a search for the unique identifier. Thus, the unique identifier links all the computer-readable tables in which the multiple fragments are stored. In this manner, by fragmenting a single form into multiple fragments, and by linking each fragment, the form processing engine 130 creates a one-to-one relationship between fragments that collectively store data received in a single form 120.

The form processing engine 130 can include a receiver to 145 to receive the form data through the form 120. A directive detection unit 150 can scan the form 120 to identify the instructions 140 included in the form. Based on the instruction, a data splitting unit 155 can fragment the form data into the multiple fragments. Each fragment can be linked using a table linking unit 160. Each of these units can be implemented as computer program executable by data processing apparatus.

In the implementation described previously, based on the instruction 140, the form processing engine 130 fragmented the form data received in a single form into multiple fragments, and stored each fragment in a corresponding table in the storage unit 135. In some implementations, as described previously, the instructions 140 can be encoded into the form as hidden fields that are invisible to the user 105. For example, an electronic form designer can encode the form to add hidden fields. In particular, the form designer can encode instructions 140 that define specific fields of data that are to be fragmented into specific fragments. Alternatively, or in addition, the form can be encoded such that a user who enters form data into the form can provide the instructions 140. For example, the form designer can encode the form to add visible fields accessible by a user who collects (or enters) the form data. At any stage during data collection, the user can specify, in the visible fields, specific fields that are to be fragmented. To do so, for example, the user can enter values into a visible field encoded in the form.

Based on the instructions 140, the form processing engine 130 identifies tables and fields in the storage unit 135 to which fragmented is to be written (i.e., stored). Upon receiving the form, the engine 130 matches form data (for example, incoming field data) to fields in the storage unit 130 to write the data. If the tables and fields do not exist in the storage unit 130, then the form processing engine 130 is configured to create such tables and fields. Techniques for doing so are described in U.S. application Ser. No. 12/758,634 entitled "Dynamically Creating Tables to Store Received Data," the entire contents of which are incorporated herein by reference.

In some situations, the form can receive multiple rows of data, each row of data meant for storing in a corresponding table. It can be more advantageous, however, to store all rows of data in the same table in the storage unit 135. For example, if the form is an order form into which a user 105 is entering a list of items, it is more advantageous for each item to be stored in a vertical column rather than in a single horizontal row. In such situations, the instruction 120 can specify that all rows of data are to be stored in the same table in the storage unit 135. Upon receiving the form and identifying the instruction, the form processing engine 130 can store the multiple rows of data in the same table in the storage unit 135. An example of such a form is described with reference to FIG. 3A.

Figure 2:
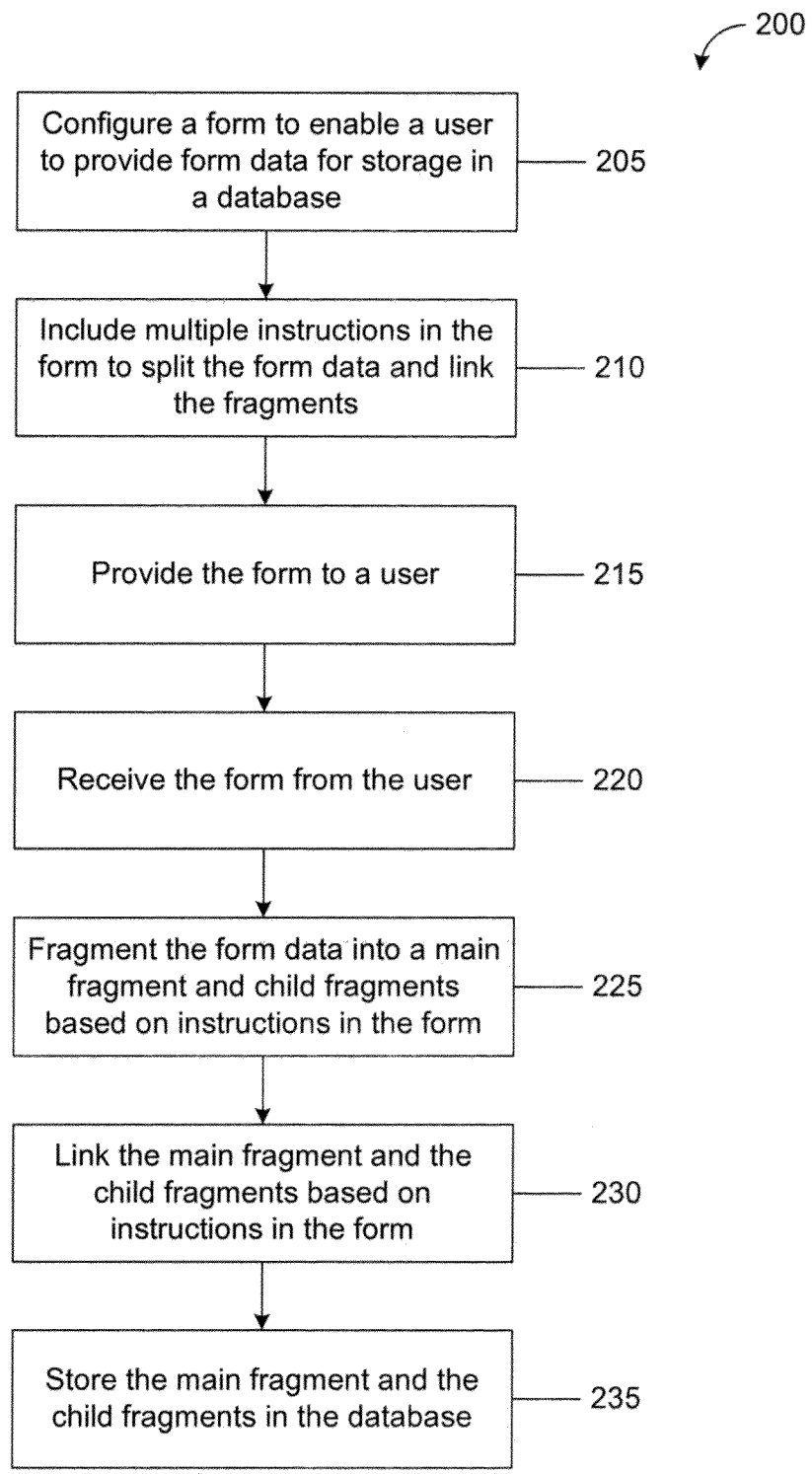
FIG. 2 is a flowchart of an example process for fragmenting data received in a form into fragments for storage.

FIG. 2 is a flowchart of an example process 200 for fragmenting data received in a form into fragments for storage. At 205, a form is configured to enable a user to provide form data for storage in a database. At 210, multiple instructions are included in the form to fragment the form data into multiple fragments and to link the fragments. In some implementations, based on the instructions, specific fields of the form data can be submitted to multiple tables in a database. At 215, the form can be provided to a user. In some implementations, the form can be transmitted to the user over one or more networks, for example, the Internet. Alternatively, or in addition, the form can be hosted on a web page of a website that the user can access using a Uniform Resource Locator (URL). The user can download the form from the web page. In some situations, the form can be transmitted to the user via electronic mail or on a computer-readable medium (for example, CD-ROM, and the like).

At 220, the form can be received from the user. For example, the user can enter data in various fields of the form and transmit the form over one or more networks, for example, the Internet. At 225, the form data can be fragmented into a main fragment and one or more child fragments based on the instructions in the form. At 230, the main fragment and the one or more child fragments can be stored in the database.

In some implementations, one of the instructions in the form can be encoded as a hidden field that holds a primary key. The primary key can be common to all the main fragment and the child fragments and can serve as an identifier that links the fragments. In some implementations, the primary key can be created using the "RANDOM_prefix" tag to create a unique value for the primary key field. Alternatively, a globally unique field like e-mail address can be used as the primary key field. To validate the primary key, the form can be encoded to require that the e-mail field be in the form. In some implementations, a unique value can be programmatically inserted into a field selected to hold the primary key. The primary key can be in the form of a Hyper Text Markup Language (HTML) tag, such as, for example, <input type="hidden" name="MASTER_KEY" value="Email">

As described previously, an instruction to fragment the form data into a main fragment and a child fragment can include a pair of directive fields. A first directive of the pair can be a sub-instruction that identifies a location of the database. A second directive of the pair can be another sub-instruction that identifies a fragment of the form data (for example, the child fragment) to be stored in the location of the database identified by the first directive. For example, the first directive can be a "CHILD_TABLE" field that defines a name of the table in which the child fragment will be stored, and the second directive can be a "CHILD_DATA" field that sets the list of fields to be included in the child table. In some implementations, the field names to be stored in the child table can be separated by a de-limiter, for example, "|". The child tables can be specified in sets defined with numeric extensions (for example, 1, 2, 3, and so on). A field may be used once in a child table.

In some implementations, the instructions can be HTML tags. For example, the first directive can be encoded to create two child tables, namely, "CHILD_TABLE_1" and "CHILD_TABLE_2". The first child table can be encoded to store two fields, such as, (first_name, last_name). The second child table can be encoded to store one field, such as, (comments). In this manner, a one-to-one database table relationship can be defined. Example directives can be encoded as shown below:

```
<input type="hidden" name="CHILD_TABLE_1" value="ChildTable1">
<input type="hidden" name="CHILD_DATA_1" value="first_name|last_name">
<input type="hidden" name="CHILD_TABLE_2" value="ChildTable2">
<input type="hidden" name="CHILD_DATA _1" value="comments">
```

In some implementations, the electronic form designer can insert the values into the HTML tags while encoding the electronic form. Alternatively, or in addition, the designer can encode the form to dynamically create values and insert the values in the HTML tags.

Figure 3A:
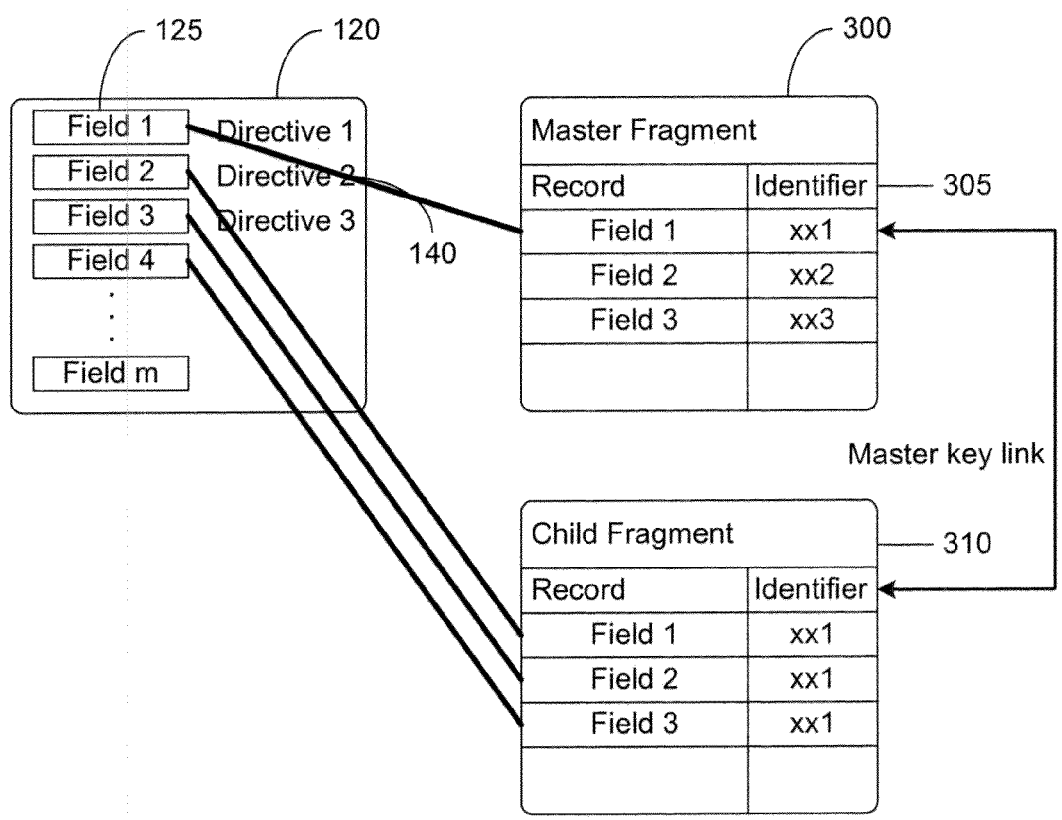
FIG. 3A is a first example of splitting form data into fragments.

FIGS. 3A-3D show four examples of splitting form data into fragments. As shown in FIG. 3A, a form 120 including several fields 125 (field 1, field 2, field 3, . . . , field m) is received. The form 120 includes multiple instructions 140 (directive 1, directive 2, and directive 3). One of the instructions 140 specifies that the received form data is to be divided into a main fragment and a data fragment for storage in a main table 300 and a data table 310, respectively. In some implementations, an instruction can specify a main fragment and a data fragment. In alternative implementations, if a data fragment is not specified, then all the form data is stored in the main table. Thus, the form data is fragmented into child fragments only if a child fragment is specified.

For example, the form 120 shown in FIG. 3A can be an event registration form that includes a field (for example, Field 1) that specifies a name of a company that is registering for an event and another field (for example, Field 2, Field 3, Field 4) that specifies information about an employee (first name, last name, and the like) of the company that is registering for the event. It will be advantageous to store the names of all the companies registering for the event in one table (for example, master table 300), and, for each company, to store in a corresponding table (for example, child table 310), information about the employees of the company. The instructions 140 can be encoded such that the form is fragmented into a main fragment that includes Field 1 and a child fragment that includes Field 2, Field 3, and Field 4. The master fragment can be stored in the master table 300 and the child fragment can be stored in the child table 310. The master table 300 and the child table 310 can each store an identifier 305 that serves as a key that links the master fragment and the child fragment through a master key link. Because the master table 300 stores information about multiple companies, each company is associated with a corresponding key. Because the child table 310 corresponding to a company stores information about employees of that company, the keys associated with each field in the child table 310 can be identical.

Figure 3B:
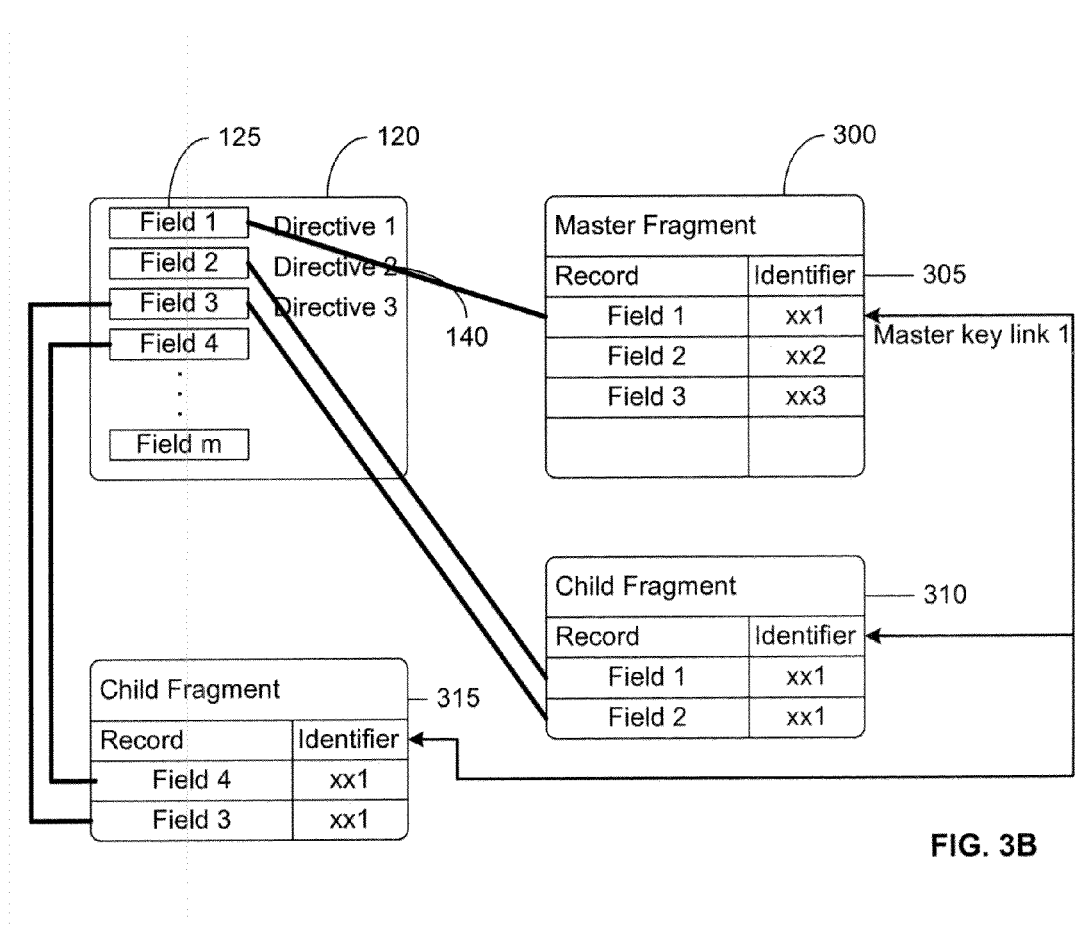
FIG. 3B is a second example of splitting form data into fragments.

FIG. 3B is a second example of splitting form data into a master fragment and two data fragments. For example, the form 120 shown in FIG. 3B can be an event registration form that is similar to the event registration form shown in FIG. 3A. The instructions 140 can be encoded such that the form is fragmented into a main fragment that includes Field 1, a first child fragment that includes the data in Field 2 and Field 3, and a second child fragment that includes the data in Field 3 and Field 4. The master fragment can be stored in the master table 300, the first child fragment can be stored in the child table 310, and the second child fragment can be stored in the child table 315. The fragments of the form data in the first child fragment and the second child fragment can be related to the form data stored in the first row of the master table 300. Theses fragments of the form data can be linked by a unique identifier 305, for example, "xx1." Additional identifiers, for example, "xx2," "xx3," and the like, can associate second and third rows of form data in the master table 300 with third and fourth child fragments, respectively.

As shown in FIG. 3B, the form data in field 3 can be stored in both the child table 310 and the child table 315. Further, whereas the form data in "Field 3" and "Field 4" of the electronic form 120 are received in the third and fourth row of the form 120, respectively, the order in which the form data is stored in the child table 315 can be swapped.

To perform the swapping, and, more generally, to change the order in which the electronic data in the form is received, the fields in the form can be remapped when fragmented, for example, to a child fragment. In addition, because field names on forms are unique, the field names can be remapped using particular instructions. In some implementations, a tag that is normally included in an instruction to separate two fields can be modified to remap field names. For example, in normal usage, the tag "CHILD_DATA" can include field names, for example "first_name" and "last_name" separated by a de-limiter, such as, "|" or any other suitable de-limiter. To remap field names, the field name to be remapped can be included in front of the desired field name and separated by a separating character, for example, ":". For example, "first_name2:first_name|last_name2:last_name."

To map multiple fields to a single table called "Child-Table1," the following instructions, in HTML format, can be used:

```
<input type="hidden" name="CHILD_TABLE_1"
value="ChildTable1">
<input type="hidden" name="FR_CHILD_DATA_1"
value="first_name|last_name">
<input type="hidden" name="CHILD_TABLE_2"
value="ChildTable1">
<input type="hidden" name="FR_CHILD_DATA_2"
value="first_name2:first_name|last_name2:last_name">
<input type="hidden" name="CHILD_TABLE_3"
value="ChildTable1">
<input type="hidden" name="FR_CHILD_DATA_3"
value="first_name3:first_name|last_name3:last_name">
```

Figure 3C:
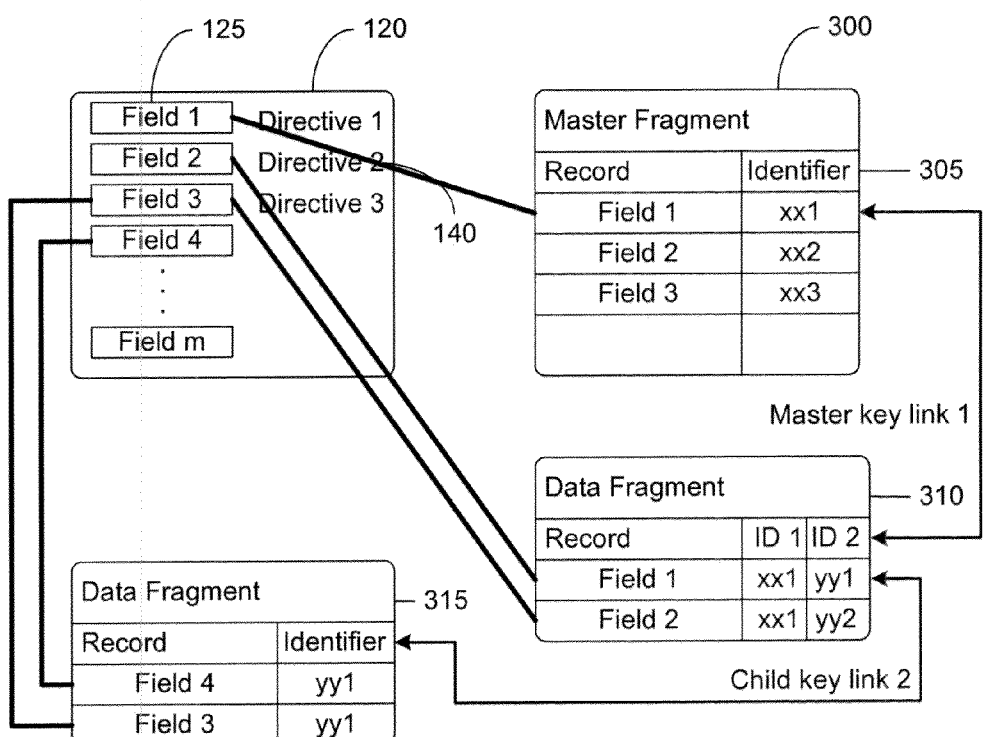
FIG. 3C is a third example of splitting form data into fragments.

FIG. 3C is another example of fragmenting data in the form into fragments, specifically, a master fragment, and four child fragments. The master fragment is stored in a master table. Two of the child fragments are stored in a first child table, which is associated with the master table. The other two child fragments are stored in a second child table, which is directly associated with the first child fragment. For example, the master fragment is stored in a master table 300. Each row of form data in the master table is associated with a unique identifier 305. The first and second child fragments are stored in a child table 310. All rows of the form data in the child table 310 are associated with the unique identifier 305. Consequently, the child table 310, in its entirety, is associated with the master table 300 through a master key link. In addition, each row of form data in the child table 310 is associated with another unique identifier that is different from the identifier 305. The third and fourth child fragments are stored in another child table 315. All rows of the form data in the child table 315 are associated with the other unique identifier. Thus, the child table 315, in its entirety, is associated with the child table 310 through a child key link. The instructions included in the form can be encoded to identify the data to be fragmented, fragment the data received in the form, and store the fragmented data in corresponding tables.

Figure 3D:
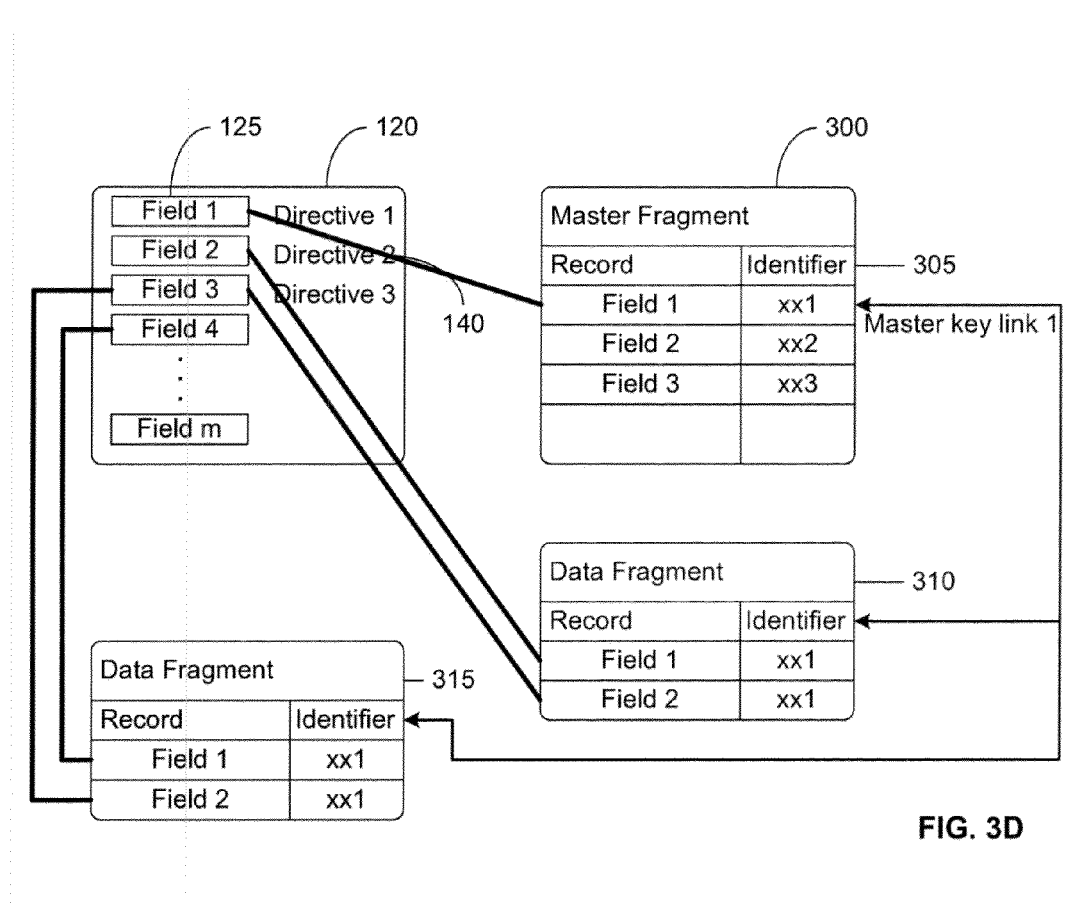
FIG. 3D is a fourth example of splitting form data into fragments.

FIG. 3D is a fourth example of splitting data into fragments in which the data is fragmented into a master fragment stored in a master table 300 and two child fragments stored in child table 310 and child table 315, respectively. The fragments of the form data stored in both child tables are associated with a first row of the master table 300 by a unique identifier 305. Whereas the fragment stored in the child table 310 includes the data in Field 2 and Field 3 of the form, the fragment stored in child table 315 includes the data in Field 3 and Field 4 of the form. In some implementations, the fields in the form can be renamed prior to, during, or after fragmenting and before being stored in the child table.

In some implementations, an instruction can be encoded such that the data in multiple rows of the form will be stored in a child table. However, when the form is received, it can be determined that one of the rows does not include any data. Another instruction can be encoded in the form to ignore the blank of row of data, in such a situation. In such implementations, only the fields with data are fragmented and stored in fragments.

In some implementations, an instruction can be encoded into the form such that, upon execution of the instruction, the data in multiple rows of the form will be fragmented and stored in a child table. When the form is received, the form processing engine 130 can determine whether one of the rows does not include data that is intended to be stored in that row. Because the absence of data is intentional, the condition of detecting the absence of data is not an error. Another instruction can be encoded in the form such that, upon execution of the other instruction, the form processing engine 130 will ignore the missing column and not treat the condition as an error.

Figure 4:
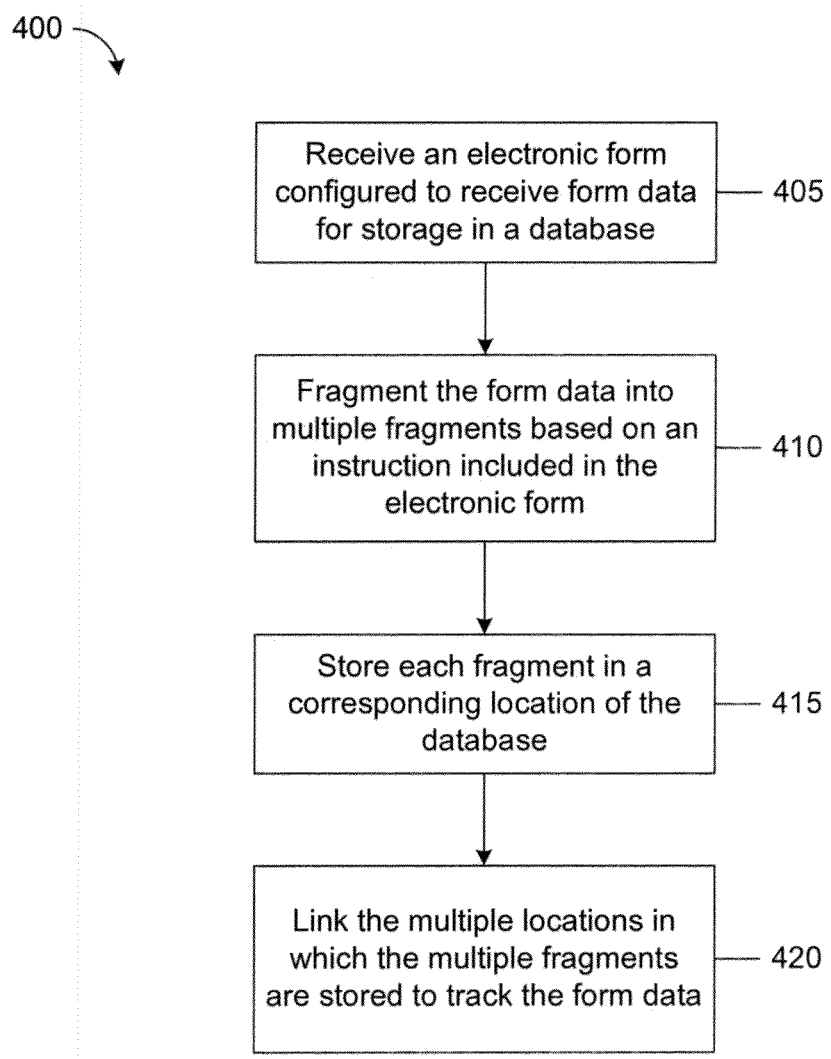
FIG. 4 is a flowchart of an example of a process for fragmenting data received in a form.

FIG. 4 is a flowchart of an example of a process 400 for fragmenting data received in a form. At 405, an electronic form can be configured to receive form data for storage in a database. At 410, the form data can be fragmented into multiple fragments based on an instruction included in the electronic form. At 415, each fragment can be stored in a corresponding location of the database. At 420, the multiple locations in which the multiple fragments are stored can be linked to track the form data.

The multiple fragments can include a master fragment and a child fragment linked by an identifier stored in both the master fragment and the child fragment. The identifier can be dynamically generated. The instruction includes a first sub-instruction (for example, a first field) that identifies a location of the database and a second sub-instruction (for example, a second field) that identifies a fragment of the form data to be stored in the location of the database identified by the first sub-instruction. The first sub-instruction and the second sub-instruction can be configured to receive variable values.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a random or serial access memory device, or a combination of one or more of them.

The term "processing device" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other module suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the specification have been described. Other implementations are within the scope of the following claims. For example, the actions recited in the claims can be performed in a different order and still achieve desirable results.

Many databases can only accept 256 fields in a single table. If an electronic form contains more than 256 fields, then the table in the database will reject or truncate the incoming data. The techniques described below allow directives in electronic form to instruct the automatic splitting of the incoming form data into more than one table to accept all of the field data.

Many electronic forms have sections that repeat. When field data repeats, it is best practice to capture that data as individual records in linked tables in a database. This is called a one-to-many relationship. The techniques described here allow directives in an electronic form to dynamically create one-to-many-relationships from repeating form sections.

The processes described with reference to the figures that follow are implemented by executing algorithms that can interpret the directives described. In the context of an HTML form submission, the directives would be hidden fields in the form. When the form submission is received, the processes interpret the directives and organize all of the data submitted into one or more data fragments. For example, the fragments are a set of submitted fields. The data fragments can be represented as FormRouter XML data chunks. The XML data chunks can later be interpreted by the FormRouter Client Tool as rows in database tables or as pieces of data in other non-database storage containers.

The processes first look for a few directives that affect the overall behavior. The master table name is defined using another directive and any fields not used in split directives will be assigned to that master table. The processes then look for the split directives. The split directives are found in pairs or in trios and then put into sets using a naming convention. The sets of split directives are then interpreted and the data fragments are built using those directives.

The processes first look for a few directives that affect its overall behavior. One of those directives tells the processes to ignore a field, in a split directive, that cannot be found in the collection of all fields. One of the other directives it looks for is an "ignore blank rows" directive. This means that if a split directive is evaluated and none of the fields inside that directive are found in the collection of all fields, the data fragment built by that split could be ignored (depending on some other factors). One of the other directives it looks for is a default master key link directive. Any split directive that is not matched up with a key link directive will default to using the master key link directive and be linked back to the master data fragment. At this time, the field(s) indicated by this directive is searched for in the collection of all fields and if any of them are not present or have no value, it is considered an error. The last directive it looks for that affects overall behavior is the master table name. Any fields not used in split directives will be assigned to that master data fragment.

The split directives are found in pairs or in trios. When the split data is being linked back to the master table using the default master key link, only a pair of directives is necessary. The split directives are matched up using a naming convention. One directive, if present, designates which data fragment should be related to this new data fragment by copying key field(s) from that fragment to this fragment. Another directive gives the name of the data fragment to be formed. The last directive lists the fields to be assigned to that fragment and also provides a convention for renaming the fields once they are in the data fragment. The sets of split directives are then interpreted.

For each set, a data fragment will be created with the name from one of the directives in the set. The key directive from that set will then be evaluated. If the key directive is not present, it will be assumed to be a master key link and those fields, from the set of all fields, as listed in the master key link directive, are added to this data fragment. If the key directive is present those fields, from the set of all fields, as listed in the directive, are added to this data fragment. If one or more of those fields were not found or contained no value, it would be considered an error. Finally, the directive that designates which fields should be in this fragment is evaluated.

The list of fields is split on a delimiter. Each item from the split is then evaluated. If the field indicated by that item is not found in the collection of all fields, the processes check to see if a directive was found earlier that allows the field to be missing. If that directive was not found, it is considered an error. If that directive was found, the processes move on to the next item. The item is then inspected for a second delimiter that tells the algorithm that the field needs to be renamed when it appears in the data fragment. If that delimiter is found, the field is added to the data fragment but the new name is used as the name part. If the delimiter was not present, the field is just added to the data fragment with the existing name and value. The field name that was used from the collection of all fields is then added to a list of field names to exclude from the master data fragment.

After all items are evaluated, if the only fields in the data fragment are the key fields, and the "ignore blank rows" directive was found earlier, this data fragment is marked for possible removal. The name of this directive set is added to a graph (with the master data fragment at the "root"). The graph will show the dependencies of data fragments on each other based on keys used. When all split directive sets have been evaluated, if the "ignore blank rows" directive was found earlier, the data fragments that have been marked for possible removal are found using a depth-first search and dropped as long as there is not a node dependent on it that is not dropped.

Finally, the master data fragment is composed of the master key field and any other fields not in the list of fields to exclude. It may make sense to add another directive in the future to have the algorithm not build the master data fragment (if the user wanted to specify how to compose all fragments). In some implementations, the electronic form can receive data in Extensible Markup Language (XML) format. Often, XML format is used to include repeating rows of data in a form. The XML data can be broken into fragments that create master and child fragments, as described above. To do so, in some implementations, the form processing engine 130 can be configured to interrogate the XML structure to identify repeating rows, and break the rows into fragments for storing in corresponding child tables. In such implementations, the form processing engine 130 can dynamically create names for the child tables and the unique identifiers that link the fragments.

What is claimed is:

1. A computer-implemented method comprising:
   receiving, from a user and at a computer system including one or more computers, an electronic form for storage in a database configured to store form data, wherein the electronic form includes form data entered through several fields included in the electronic form and wherein the electronic form also includes an instruction to fragment the form data into a plurality of fragments of the form data;
   fragmenting, by the computer system, the form data into the plurality of fragments of the form data based on the instruction, the plurality of fragments including a master fragment and a child fragment that are linked by a common identifier that is present in each of the master fragment and the child fragment;
   storing, by the computer system, each fragment of the form data in a corresponding location of the database; and
   linking, by the computer system, a plurality of locations of the database in which the plurality of fragments of the form data are stored to track the form data.

2. The method of claim 1, comprising, dynamically generating the identifier upon receiving the electronic form.

3. The method of claim 1, wherein the instruction includes a first sub-instruction that identifies a location of the database and a second sub-instruction that identifies a fragment of the form data to be stored in the location of the database identified by the first sub-instruction.

4. The method of claim 3, wherein fragmenting the form data into the plurality of fragments of the form data based on the instruction comprises storing the fragment of the form data identified by the second sub-instruction in the location of the database identified by the first sub-instruction.

5. The method of claim 3, wherein the first sub-instruction and the second sub-instruction are configured to receive variable values that specify the location of the database and the fragment of the form data, respectively.

6. The method of claim 1, further comprising:
determining that a sub-instruction, included in the instruction, that identifies a location of the database in which a fragment of the form data is to be stored does not have a value; and
in response to the determining, storing the fragment of the form data in a default location of the database.

7. The method of claim 1, wherein a location of the database includes a table comprising a plurality of fields, and
wherein fragmenting the form data into the plurality of fragments of the form data comprises determining that a first number of a plurality of first fields included in the electronic form to receive the form data is greater than a second number of the plurality of fields included in the table.

8. The method of claim 1, wherein the plurality of fragments include a first child fragment that is associated with the master fragment using a first identifier, and a second child fragment that is associated with the first child fragment using a second identifier distinct from the first identifier.

9. The method of claim 1, wherein the instruction is based on the form data entered by the user in the electronic form.

10. A non-transitory computer-readable medium, tangibly encoding computer program instructions executable to cause one or more computers to perform operations comprising:
receiving, from a user, an electronic form for storage in a database configured to store form data, wherein the electronic form includes form data entered through several fields included in the electronic form and wherein the electronic form also includes an instruction to fragment the form data into a plurality of fragments of the form data;
fragmenting the form data into the plurality of fragments of the form data based on the instruction, the plurality of fragments including a master fragment and a child fragment that are linked by a common identifier that is present in each of the master fragment and the child fragment;
storing each fragment of the form data in a corresponding location of the database; and
linking a plurality of locations of the database in which the plurality of fragments of the form data are stored to track the form data.

11. The medium of claim 10, the operations comprising, dynamically generating the identifier upon receiving the electronic form.

12. The medium of claim 10, wherein the instruction includes a first sub-instruction that identifies a location of the database and a second sub-instruction that identifies a fragment of the form data to be stored in the location of the database identified by the first sub-instruction.

13. The medium of claim 12, wherein fragmenting the form data into the plurality of fragments of the form data based on the instruction comprises storing the fragment of the form data identified by the second sub-instruction in the location of the database identified by the first sub-instruction.

14. The medium of claim 12, wherein the first sub-instruction and the second sub-instruction are configured to receive variable values that specify the location of the database and the fragment of the form data, respectively.

15. The medium of claim 10, the operations further comprising:
determining that a sub-instruction, included in the instruction, that identifies a location of the database in which a fragment of the form data is to be stored does not have a value; and
in response to the determining, storing the fragment of the form data in a default location of the database.

16. The medium of claim 10, wherein a location of the database includes a table comprising a plurality of fields, and
wherein fragmenting the form data into the plurality of fragments of the form data comprises determining that a first number of a plurality of first fields included in the electronic form to receive the form data is greater than a second number of the plurality of fields included in the table.

17. The medium of claim 10, the operations comprising:
identifying that the instruction includes a sub-instruction configured to dynamically vary a number of fields in the electronic form; and
based on the identifying:
determining that a number of fields of form data received is greater than a number of fields of form data that the electronic form is configured to receive, and
dynamically increasing the number of fields of form data to be at least equal to the number of fields of form data received.

18. The medium of claim 10, wherein the plurality of fragments include a first child fragment that is associated with the master fragment using a first identifier, and a second child fragment that is associated with the first child fragment using a second identifier distinct from the first identifier.

19. The medium of claim 10, wherein the instruction is based on the form data entered by the user in the electronic form.

20. A system comprising:
data processing apparatus; and
a computer-readable medium tangibly storing computer program instructions executable by the data processing apparatus to perform operations comprising:
receiving, from a user, an electronic form for storage in a database configured to store form data, wherein the electronic form includes form data entered through several fields included in the electronic form and wherein the electronic form also includes an instruction to fragment the form data into a plurality of fragments of the form data;
fragmenting the form data into the plurality of fragments of the form data based on the instruction, the plurality of fragments including a master fragment and a child fragment that are linked by a common identifier stored in each of the master fragment and the child fragment;
storing each fragment of the form data in a corresponding location of the database; and
linking a plurality of locations of the database in which the plurality of fragments of the form data are stored to track the form data.

21. The system of claim 20, wherein the instruction includes a first field that stores a first value identifying a location of the database and a second field that stores a second value identifying a fragment of the form data to be stored in the location of the database identified by the first value.

22. The system of claim 20, wherein the plurality of fragments include a first child fragment that is associated with the master fragment using a first identifier, and a second child fragment that is associated with the first child fragment using a second identifier distinct from the first identifier.

23. The system of claim 20, wherein the instruction is based on the form data entered by the user in the electronic form.

24. A computer-implemented method comprising:
receiving, from a user and at a computer system including one or more computers, an electronic form for storage in a database configured to store form data, wherein the electronic form includes form data entered through several fields included in the electronic form and wherein the electronic form also includes an instruction, which is generated based on data entered by the user in the electronic form, to fragment the form data into a plurality of fragments of the form data;
fragmenting, by the computer system, the form data into the plurality of fragments of the form data based on the instruction;
storing, by the computer system, each fragment of the form data in a corresponding location of the database; and
linking, by the computer system, a plurality of locations of the database in which the plurality of fragments of the form data are stored to track the form data.

25. The method of claim 24, wherein the data entered by the user in the electronic form includes values entered into a visible field encoded in the form, the method comprising:
generating, by the computer system, the instruction based on the values entered in the visible field encoded in the form; and
fragmenting, by the computer system, specific fields in the electronic form based on the generated instruction.

26. The method of claim 24, wherein the plurality of fragments includes a master fragment and a child fragment, and wherein the master fragment and the child fragment are linked by a same identifier stored in both the master fragment and the child fragment.

27. The method of claim 26, comprising:
dynamically generating the identifier upon receiving the electronic form.

28. The method of claim 26, wherein the plurality of fragments includes a first child fragment that is associated with the master fragment using a first identifier, and a second child fragment that is associated with the first child fragment using a second identifier distinct from the first identifier.

29. The method of claim 24, wherein the instruction includes a first sub-instruction that identifies a location of the database and a second sub-instruction that identifies a fragment of the form data to be stored in the location of the database identified by the first sub-instruction.

30. The method of claim 29, wherein fragmenting the form data into the plurality of fragments of the form data based on the instruction comprises storing the fragment of the form data identified by the second sub-instruction in the location of the database identified by the first sub-instruction.

31. The method of claim 29, wherein the first sub-instruction and the second sub-instruction are configured to receive variable values that specify the location of the database and the fragment of the form data, respectively.

32. The method of claim 24, comprising:
determining that a sub-instruction, included in the instruction, that identifies a location of the database in which a fragment of the form data is to be stored does not have a value; and
in response to the determining, storing the fragment of the form data in a default location of the database.

33. The method of claim 24, wherein a location of the database includes a table comprising a plurality of fields, and wherein fragmenting the form data into the plurality of fragments of the form data comprises determining that a first number of a plurality of first fields included in the electronic form to receive the form data is greater than a second number of the plurality of fields included in the table.

* * * * *